Nov. 3, 1953

C. W. EADE ET AL 2,657,403

BLANK FORMING APPARATUS

Filed May 29, 1950

INVENTORS
Carleton W. Eade
William W. Schug

By Strauch, Nolan & Diggins
Attorneys

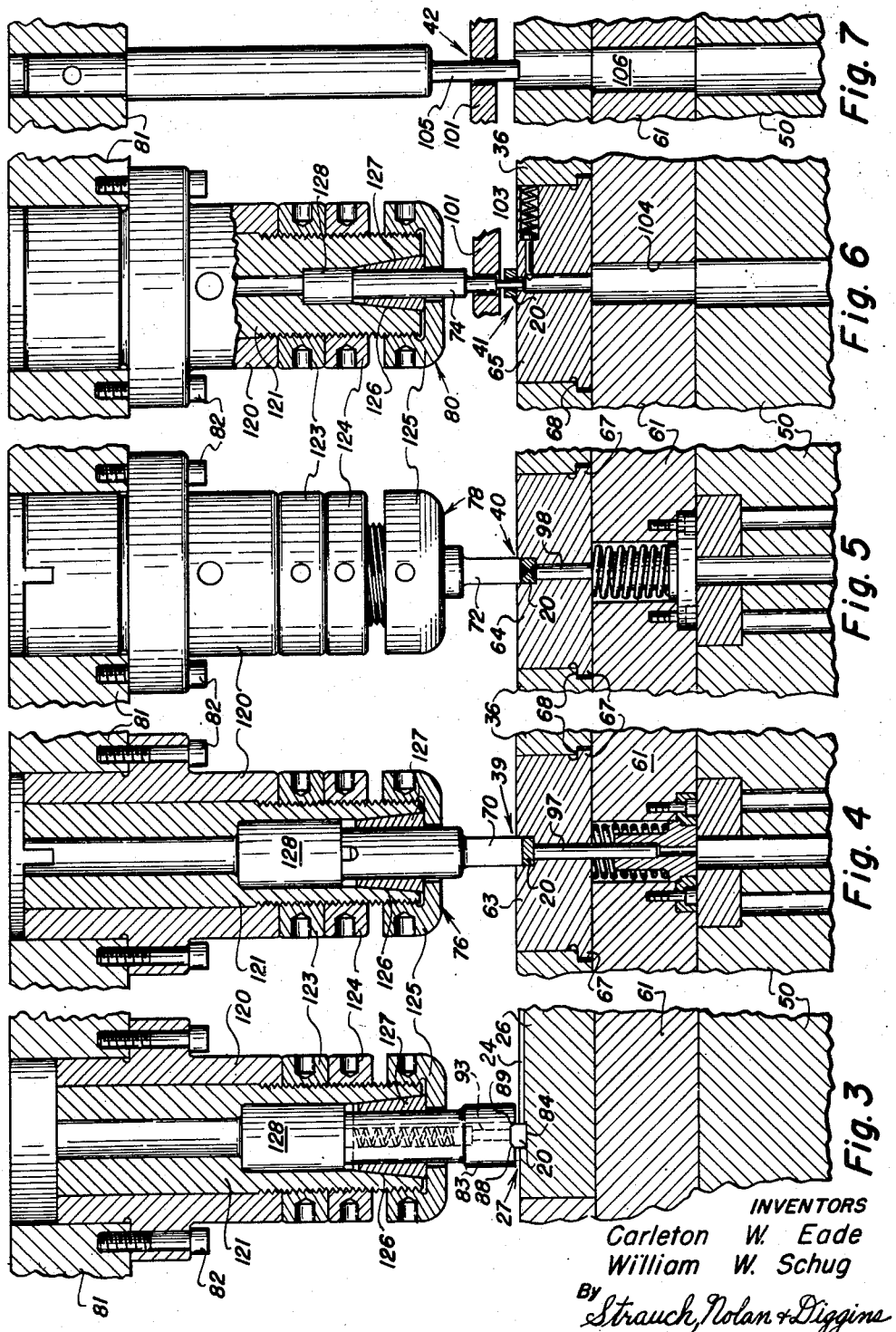

Nov. 3, 1953 C. W. EADE ET AL 2,657,403
BLANK FORMING APPARATUS
Filed May 29, 1950 4 Sheets-Sheet 3
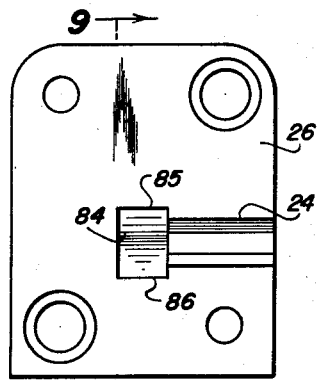
Fig. 8
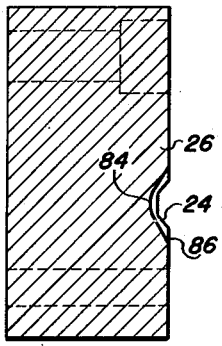
Fig. 9
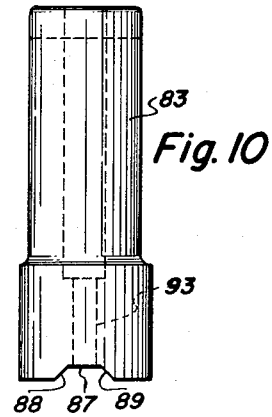
Fig. 10
Fig. 11
Fig. 12
Fig. 13
Fig. 23
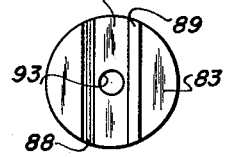
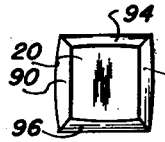
Fig. 14
Fig. 15
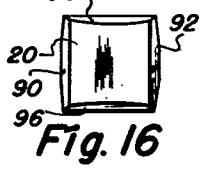
Fig. 16
Fig. 17
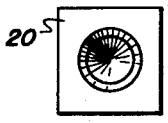
Fig. 18
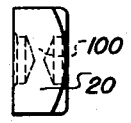
Fig. 19
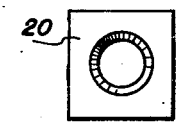
Fig. 20
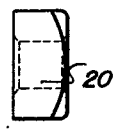
Fig. 21
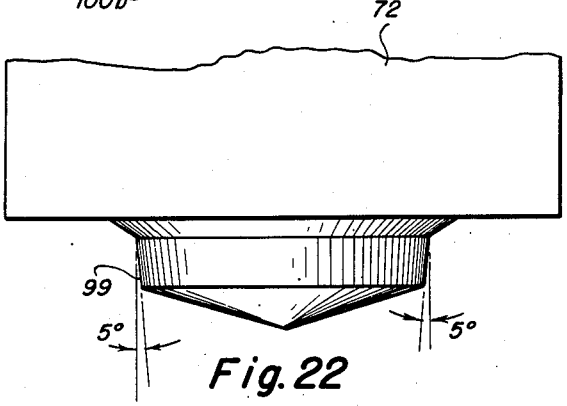
Fig. 22
INVENTORS
Carleton W. Eade
William W. Schug
BY Strauch, Nolan & Diggins
Attorneys INVENTORS
Carleton W. Eade
William W. Schug
BY Strauch, Nolan & Diggins
ATTORNEYS Patented Nov. 3, 1953

2,657,403

UNITED STATES PATENT OFFICE 2,657,403

BLANK FORMING APPARATUS

Carleton W. Eade, Milldale, Conn., and William W. Schug, Hudson, N. Y.; said Eade assignor, by mesne assignments, to The Dalemill Company, Waterbury, Conn., a corporation of Connecticut, and said Schug assignor, by mesne assignments, to Emhart Manufacturing Company, Hartford, Conn., a corporation of Delaware Application May 29, 1950, Serial No. 165,086

6 Claims. (Cl. 10—77)

This invention relates to blank forming apparatus, and has particular reference to a method and apparatus for cold forming blanks, such for example as nut or grommet blanks and the like, from round finished wire or rod stock.

Prior attempts to make square nuts from round stock in the usual nut making machines have failed because of the difficulty of forming the metal of a round stock slug into a square shape with the corners completely filled. Such an attempt is illustrated in U. S. Patent Number 2,069,008 to Jerome W. Howard. In the Howard patent, which appears to be the closest prior art, it will be readily apparent that the nuts produced are not completely square because it is not possible to fill in the corners by the method used. The nuts illustrated are more nearly octagonal in shape than square, and normally would not be satisfactory for use where square nuts are required.

Because of the shortcomings of the prior art in making multiple dimensioned blanks such as square and rectangular nut and like swaged blanks from round stock, the common practice heretofore has been to cold punch or shear the blank from hot drawn rectangular stock. It is a well-known fact that such material is more costly than round stock, and for this reason it has always cost more to produce a cold punched finished square nut than to produce a hexagonal or round nut which may satisfactorily be made from round stock in accordance with prior methods.

In addition to the objectional cost of using hot drawn rectangular stock as stock for such use, there are many other disadvantages of this prior method which are eliminated by the novel blank making method and machinery disclosed herein. In the first place, hot drawn rectangular stock must be pickled in acid to remove the scale. The elimination of this step results in large savings in manpower and equipment. In addition to this, coils of hot drawn rods are frequently misshapen causing machine shutdowns and resultant loss in production as well as possible injury to employees. Since round wire or rods are normally kept in stock for the production of bolts, the added need for hot drawn rectangular stock for square nuts involves maintaining two raw material storages and additional handling equipment and manpower, all of which may be eliminated if round stock can be used in making square nuts as well as making bolts.

Furthermore, chamfering and burr removal, which are separate and expensive operations in the production of punched blanks, are done during the forming process of our improved cold swaged blanks, resulting in a reduction of handling time and equipment savings. This also results in increased tapping production since our improved cold swaged blanks may be hopper fed directly to the tapping unit with no loss in time for machine chamfering and burr removal. In this connection, it should be noted that while the burrs on a punched blank interfere with the tapping operation and must first be removed, the initial chamfer on both sides of our improved blanks, to be explained more fully hereinafter, not only eliminates the possibility of any protruding burrs but gives a starting guide for accurately positioning the blank during succeeding operations. The production time of the tapping operation is also increased by this invention since the holes in our cold formed blanks are more accurately centered and have closer diameter tolerance than the holes in cold punched or sheared blanks which are very often distorted by the time the holes are ready to be tapped. The more accurate alignment and closer tolerance in the holes of a cold formed blank also make possible a closer overall tolerance and higher class thread in the tapped holes.

The novel method embodied in this invention of cold forming square, rectangular and like blanks from round finished wire or rods not only eliminates most of the disadvantages of the prior methods but also results in a superior product. Where the punching operations used heretofore tended to distort the blanks, the present invention provides undistorted and greatly improved blanks with accurately centered holes. Furthermore, with blanks such as those used for square nuts, our improved cold forming method yields blanks, and therefore nuts, with flat and parallel faces and with an appearance which is superior from the engineering standpoint and from the point of sales appeal.

By way of example, from an overall production standpoint our invention results in savings of approximately 30% to 35% of the material needed in making similar cold punched nuts. With considerably less material wasted, the scrap storage bin capacity can be reduced and removal time and equipment are saved. Most noteworthy, however, is the fact that with our novel cold forming or swaging dial press embodied in this invention there is, for example, an increase in production per machine of about 100% over the production of the old cold punch nut or similar blank press, utilizing the same manpower per machine. Also of great importance is the fact that there is much greater tool life with cold forming or swaging tools as against cold punch tools, and the setup requires less time and can be maintained longer. This increase in tool life and ease of setup also aids materially in increasing production and lowering costs.

Our present invention, therefore, provides for an efficient and economical method and the necessary apparatus for forming our improved blanks from round stock. Thas has been accomplished through the use of a novel pre-forming operation for applying the forming pressures to the curved surface of a cylindrical slug, and improvements on a conventional dial feed type of die press. With this invention square, rectangular and odd shaped blanks may be produced rapidly, with simplicity of operation and with a very low percentage of waste material. These factors together with the comparatively low cost of the round stock enable a material saving in this process over those of the prior art.

With these and other considerations in view, it is an important object of this invention to provide an economical method for producing finished square, rectangular and odd shaped blanks from round stock.

Another object resides in the provision of a method for producing such blanks from round stock in which simplicity of operation is achieved.

A further object resides in the provision of a method of forming such blanks from round stock so that the amount of metal flow in the forming operation and the percentage of waste material is reduced to a minimum.

A still further object resides in the provision of a method of forming such blanks in which the flow of metal is always substantially downward and lateral.

An additional object resides in the provision of a pre-forming or first forming operation wherein a round slug may be transformed into a blank from which such finished blanks may readily be formed.

A further object resides in the provision of a dial feed type of press adapted to form such blanks from round stock.

A still further object resides in the provision of a blank forming press in which each punch may be individually adjusted in the vertical direction.

Other objects and advantages will be apparent from the following description in conjunction with the accompanying drawings and from the appended claims.

The accompanying drawings, in which like reference numerals are used to designate similar parts throughout, illustrate the preferred embodiments for the purpose of disclosing the invention. The drawings however are not to be taken in a limiting or restrictive sense since it will be apparent to those skilled in the art that various changes in the illustrated construction may be resorted to without in any way exceeding the scope of the invention.

In the drawings:

Figure 3 is a fragmentary sectional view of the preforming station and its corresponding punch and punch holder;

Figure 4 is a fragmentary sectional view of the second forming station and its corresponding punch and punch holder;

Figure 5 is a fragmentary sectional view of the countersinking station and its corresponding punches and punch holder;

Figure 6 is a fragmentary sectional view of the piercing station and its corresponding punch and punch holder;

Figure 7 is a fragmentary sectional view of the ejecting station and its corresponding punch and punch holder;

Figure 8 is a plan view of the pre-forming die block;

Figure 9 is a sectional view of the pre-forming die block, taken through line 9—9 of Figure 8;

Figure 10 is a side view of the pre-forming punch;

Figure 11 is an end view of the pre-forming punch;

Figure 12 is an enlarged plan view of a slug before the pre-forming operation;

Figure 13 is an enlarged end view of a slug before the pre-forming operation;

Figure 14 is an enlarged plan view of a blank after the pre-forming operation;

Figure 15 is an enlarged end view of a blank after the pre-forming operation;

Figure 16 is an enlarged plan view of a blank after the second forming operation;

Figure 17 is an enlarged end view of a blank after the second forming operation.

Figure 18 is an enlarged plan view of a blank after the countersinking operation;

Figure 19 is an enlarged end view of a blank after the countersinking operation.

Figure 20 is an enlarged plan view of a blank after the piercing operation;

Figure 21 is an enlarged end view of a blank after the piercing operation;

Figure 22 is an enlarged side view of one end of the upper countersinking punch;

Figure 23 is a side view of the piercing punch;

In the present embodiments of the invention formation of square nut blanks is illustrated by way of example in a forging or punch press which is substantially conventional in design although some improvements have been made which will be fully discussed hereinafter. It will, however, be understood that odd shaped grommet, nut and similar shaped blanks, as for example plier nut and snath nut blanks, are formed with equal facility and advantage by use of our invention.

Figure 36:
Figure 36 is a plan view of a finished blank for a snath nut.
Figure 38:
Figure 38 is an end view of the finished blank for a snath nut.
Figure 37:
Figure 37 is a side view of the finished blank for a snath nut.
Figure 39:
Figure 39 is a plan view of a finished blank for a plier nut.
Figure 41:
Figure 41 is an end view of the finished blank for a plier nut.
Figure 40:
Figure 40 is a side view of the finished blank for a plier nut.

A blank for a snath nut is illustrated in Figures 36, 37 and 38, while Figures 39, 40 and 41 show a blank for a plier nut. Odd shaped blanks such as these may be formed by the invention to be described with only slight modifications in the punches and die blocks of the blank forming apparatus.

The forming is done by cold swaging, the flow of metal being substantially at right angles to the direction of pressure. The metal itself is at room temperature or a temperature below its recrystallization point. Because of these factors high pressures are used for the forming.

In the type of forging press illustrated in the drawings individual dies are used for each operation. This is a convenient and economical arrangement since on any pressure stroke of the press several operations are performed simultaneously. In the present embodiment each operation necessary to form the blank is performed on every pressure stroke of the press.

*General description*

The round stock is selected of a diameter to give the desired blank thickness and fed into the forging press assembly where it is roller fed through a straightener to a cutoff station where cylindrical slugs of an axial length slightly less than the length of a side of the blank to be formed are sheared from the wire. This portion of the assembly is not shown since it is conventional and is not a part of this invention.

Figure 1:
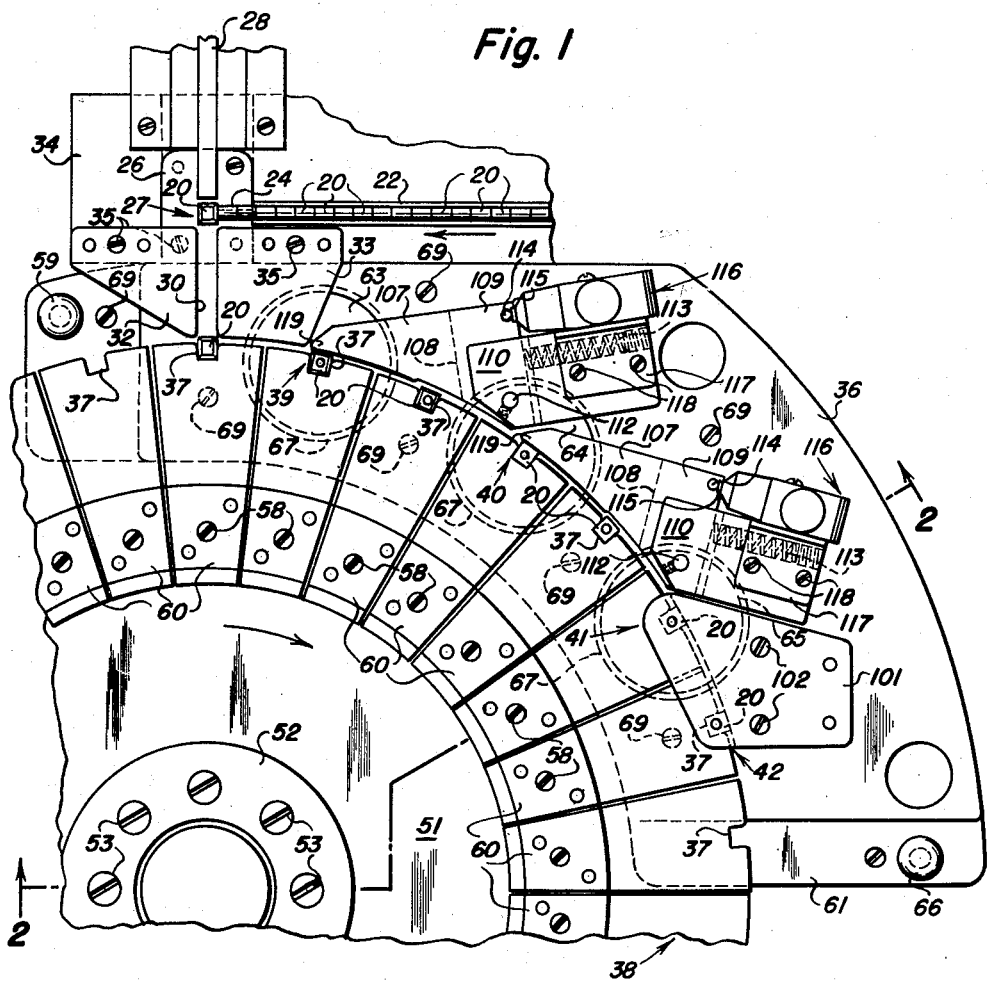
Figure 1 is a plan view of a preferred dial, die shoe, die shoe cover and pre-forming or first forming station arrangement.

Referring now to the drawings, and in particular to Figure 1, the slugs shown at 20 are conveyed from the cutoff station by conventional means (not shown) and carried in the direction of the arrow along a channel 22 into an adjoining channel 24 in the first forming die block 26. The pre-forming operation, to be described hereinafter, is preformed at the pre-forming or first forming station generally indicated at 27 and converts the slugs 20 into partially formed blanks, also designated as 20. The blank 20 is ejected from the preforming station 27 by some means such as a reciprocating push rod 28 of conventional design and operation. The ejected blank is then pushed along a channel 30 formed by guide plates 32 and 33 suitably fastened to a frame member 34 of the press by some suitable means such as screws 35. The bottom of the channel 30 is in part the pre-forming die block 26 and in part the die shoe cover plate 36 to be more fully explained hereinafter, as is best illustrated in Figure 1.

At the end of channel 30 blank 20 is pushed into an adjacent notch 37 of a circular conveyor or dial generally indicated at 38. The slug is then carried successively by dial 38 to operating stations 39, 40, 41 and 42 where the remainder of the forming operations, to be explained more fully later, are performed.

Figure 2:
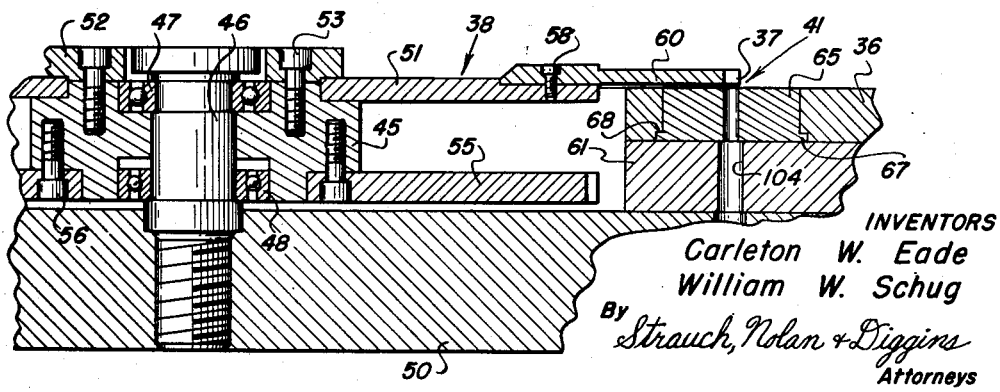
Figure 2 is a sectional view of the dial taken through line 2—2 of Figure 1 with certain parts left out.

Referring to Figures 1 and 2, dial 38 is made up of a hollow cylindrical block 45 which is mounted for free rotation on a stationary shaft 46 by means of suitable bearings 47 and 48. Shaft 46 is threaded into the forging press bolster 50 which is secured to the press frame (not shown). On its upper side block 45 supports a flat ring shaped disc 51 which is held firmly in place by means of a locking collar 52 which is securely fixed to block 45 by screws 53, as is best illustrated in Figure 2. Mounted on the lower side of block 45 is a flat ring shaped gear 55 held in place by some suitable means such as screws 56. Gear 55 is turned by means of a conventional roller gear drive, not shown, which causes the dial 38 to rotate in a clockwise direction as viewed in Figure 1. By proper adjustment of the roller gear drive and a conventional camming arrangement in connection therewith, dial 38 is intermittently rotated or indexed in phase with the operating stroke of the press so that the dial advances the blanks 20 from station to station between operating strokes and remains stationary while the operations are being performed.

Fastened to the outer edge of disc 51 by suitable means such as screws 58 are a plurality of removable dial sectors 60. There is one blank carrying notch 37 in each dial sector. As will be apparent, the dial sectors 60 may be interchanged with other dial sectors having a variety of notch sizes and shapes to accommodate any desired size or shape of blank.

Referring now to Figures 4-6, the forging press bolster is shown at 50. Mounted on bolster 50 is the die shoe 61 which in turn supports die blocks 63, 64 and 65 and the die shoe cover plate 36. The die shoe 61 is properly located on the bolster by means of dowels 66, Figure 1. As is most clearly illustrated in Figures 1 and 4-6 the die shoe cover 36 serves to locate and hold the die blocks in position. At the lower edge of each die block, 63, 64 and 65, is a flange 67; the die shoe cover 36 is undercut at 68 so that the horizontal edge of the undercut presses down of the flange 67 to secure the die block in position. In addition, the die blocks are keyed to the die shoe cover by conventional means, not shown. Die shoe cover 36 is itself located and secured on die shoe 61 by means of clamping screws 69.

Mounted above and in proper alignment with the die blocks are the punches 70, 72 and 74 securely fixed in punch holders generally indicated at 76, 78 and 80, respectively. The means for securing the punches in the punch holders and for the vertical adjustment thereof will be explained hereinafter. Punch holders 76, 78 and 80 are secured to a punch holder plate 81 by some means such as screws 82. The punch holder plate is in turn secured to the forging press slide, not shown, so that plate 81 and the punch holders are raised and lowered with the forging press slide on each operating stroke of the press.

To attain greater clarity, dial 38 has not been shown in Figures 3–7; however, referring to Figures 1 and 2 it may be seen that dial 38 rotates above the die blocks and die shoe cover 36 with just sufficient clearance to allow unimpeded rotation.

*Pre-forming station*

The first or pre-forming station 27, Figures 1 and 3 is located outside the dial 38 as is clearly shown in Figure 1. Except for its location, preforming station 27 is similar to the other operating stations in that its punch 83 is mounted in the same manner as the punches at the other operating stations so that all the operations, i. e. one at each station, are performed on each pressure stroke.

The die cavity 84 of the pre-forming die block 26, Figures 3, 8 and 9, has a concave cross section as is best illustrated in Figure 9. In the direction of the feed of slugs 20 the cavity 84 is slightly longer than the length of one slug to allow for outward forming in the lengthwise direction; it will also be seen from Figures 8 and 9 that in the direction transverse to the feed or lengthwise direction the cavity is substantially wider between cavity edges 85 and 86 than the diameter of a slug, the radius of the concave surface being larger than that of a slug, to allow for outward forming in the transverse direction. When the slug 20 is fed into the die cavity 84 it enters the cavity lengthwise on its cylindrical surface and fits loosely in the cavity in the lengthwise direction; it is then accurately centered in this direction by operation of the punch 83 in its forming stroke. The slug is also centered in the transverse direction since its cylindrical surface will lie in contact with the lowest point of the concave surface of the die cavity 84 which lowest point is in the center of the cavity. In the forming operation the slug will therefore lie spaced midway between, and with its axis parallel to, edges 85 and 86 of the cavity.

The punch 83 for the pre-forming station, Figures 3, 10 and 11, is provided on its bottom or operating surface with a channel 87 having tapered sides 88 and 89 which function initially to center the slug and then to chamfer the slug edges at 90 and 92 as shown in Figures 14 and 15. Centered within a bore in punch 83 is a spring operated holding down pin 93 which is provided for the purpose of pushing back into die cavity 84 slugs which tend to stick to the punch after the completion of its pressure stroke.

As is best illustrated in Figure 3, punch 83 is mounted so that the length of its channel 87 is at right angles to the axis of the slug 20. It will be seen that on an operating stroke punch 83 will center slug 20 axially and swage it almost to outside size, and at the same time partially flatten and chamfer the top. Figures 12 and 13 show enlarged plan and end views, respectively of slug 20 as it enters pre-forming station 31. The slug is oriented in Figure 12 in the exact position in which it will lie in die cavity 84 shown just above it in Figure 8. In Figures 14 and 15 enlarged plan and end views, respectively, are shown of a partially formed blank 20 after the pre-forming operation. The slug has been swaged to the cross section shown in the end view, Figure 15, while upper edges 90 and 92 have been chamfered as shown by the tapered sides 88 and 89 of punch 83. The other two upper edges, 94 and 96 of the slug need no chamfering since they were originally portions of the cylindrical surface of the slug and after the pressure stroke are still substantially rounded as illustrated. Thus, during the pre-forming operation cylindrical slug 20 is crowned and partially flattened without completely coming into contact with the concave surface of die cavity 84; this avoids over-forming and leaves room for the metal to be displaced by the second forming and countersinking operations without causing an upflow of metal. Thus the flow of metal in contact with tool surfaces in every operation is always down and lateral. This is important because a downward flow puts less strain on the punches and dies, requires less power and stresses the metal less than does an upward flow. This in turn provides longer life for the dies, punches and press, greater efficiency of operation, and provides improved blanks.

Second forming station

As explained hereinbefore, after a slug 20 has been partially formed at the pre-forming station 27, thereby causing it to become a partially formed blank, it is pushed from that station into a dial notch 37 of the dial 38 by means of the reciprocating push rod 28. Upon rotation of the dial in a clockwise direction as viewed in Figure 1 the blank is carried to the second forming station 39 and deposited in the die cavity of die block 63. At station 39, die block 63 has a die cavity of square cross section, Figures 1 and 4. Punch 70 for this station has a similar cross section and is made to closely fit into the die cavity as is best shown in Figure 4. Extending through die block 63 in a cylindrical bore is a knockout pin 97 which is reciprocated by conventional means and serves to knock the blank 20 out of the die cavity at the end of an operating stroke and return it to the dial notch 37 which conveys it to the next station. It is important to note that the upper end of knockout pin 97 in its normal position is always even with or slightly above the bottom surface of the die cavity. This prevents the chipping of the bottom of the cavity which takes place if the end of knockout pin 97 is positioned below the bottom surface, and consequently prolongs the life of the die.

At the second forming station 39 the blank 20 is swaged to further flatten it and square its upper surface as may be seen from Figures 16 and 17 which show enlarged plan and end views, respectively, of the blank after the second forming operation. The die cavity at the second forming station is slightly larger than the blank 20 that has been delivered to it from the pre-forming station and its dimensions are such that the blank is swaged to size during this operation allowing it to be centered in the dial carrier notch and in the die at the countersinking station. It will also be noted that the outward flow of metal has further squared the top of the blank by almost filling the spaces left by the chamfered edges, and has flowed down and outwardly to nearly fill the spaces caused by the curvature of the bottom. However, as may be seen from the end view of Figure 17, even though this flow of metal has caused a substantial flattening of the bottom some curvature remains so that room is left for the further displacement of metal which will occur at the countersinking station.

Countersinking station

At the third forming or countersinking station 40 die block 64, Figures 1 and 5, has a die cavity of square cross section of the same dimensions as those of the die cavity of die block 63 at the second forming station. The upper punch 72 for this station is also square in cross section and is made to fit the die cavity in a close fit as is best shown in Figure 5. At its tip end punch 72 is provided with a projection for performing a countersinking operation. Extending through die block 64 and into the die block cavity is the lower punch and knockout pin 98 also formed at its end for performing a countersinking operation. As shown in the enlarged view of the end of the upper punch 72, Figure 22, surface 99 of the punch is tapered about 5 degrees. This is done to provide a tapered recess which permits engagement of the punch at about mid-depth of the recess, with resultant trapping of oil (introduced by conventional means not shown) ahead of the punch, to effect a hydraulic punching and ease of stripping and thus prolong the life of the punch. The end of lower punch 98 is also tapered in a similar fashion for ease of stripping and for blank clearance. Lower punch 98 is also made to operate as a knockout pin upon the completion of the operating stroke and operates in the same manner as knockout pin 97 at the second station to move the blank up into the dial notch. It should also be noted here that the lower punch 98 is larger by a few thousandths of an inch than the upper punch 72 in order to insure a substantially burr-free burnished hole at the piercing station.

Referring to Figures 18 and 19 which show enlarged plan and end views, respectively of a blank 20 after the countersinking operation it will be seen that the metal displaced by the countersinking pressure stroke has flowed out to fill in completely the spaces at the upper edges of the blank which still remained after the second forming operation; thus the upper surface of the blank is completely flat and square and no traces are left of the two chamfered edges or the other two rounded upper edges which appeared to be chamfered due to the curvature of the cylindrical surface, as explained hereinbefore in the disclosure of the pre-forming station. It will also be seen that the countersinking has caused the metal to flow down and out filling completely the remaining spaces at the bottom of the cavity caused by the slight curvature of the bottom of the blank which still remained after the second forming operation. To avoid confusion, however, it should be noted that the bottoms of the die cavities in both the second and third operations are slightly chamfered at the corners which causes the bottom corners of the finished blank to have chamfered surfaces as is clearly shown in Figures 19 and 21. Thus, at the end of the countersinking operation the blank 20 has been completely formed to the desired blank size and shape.

Piercing and burnishing station

At the fourth or piercing and burnishing station 41, Figures 1 and 6, there is no die cavity in the die block 65 and the blank is centered and held in position by the dial 38 since the blank as prepared at the countersinking station forms its own die for the piercing operation. Also, since there is no die cavity in die block 65 no knockout pin is needed at this station to return the blank to the dial notch 37. Punch 74 at this station is a piercing and burnishing punch which hydraulically removes the small slug of metal 100, Figure 19, remaining between the countersinks after the countersinking operation. The piercing head of punch 74, Figure 23, is provided with a burnishing band 100a, to burnish the hole punched in the piercing operation. The head of punch 74 is also provided with a conical end 100b, the tapered surface of the conical end being provided to trap oil and effect a hydraulic piercing as explained in connection with upper countersinking punch 72.

Mounted just above the dial 38 is a stripper 101, located as shown in Figure 1, and fastened to the die shoe cover 36 by some means such as screws 102. Stripper 101 is pierced at the piercing and ejection stations so that the punches at these stations can pass through it with a close fit. The purpose of the stripper is to knock back into the dial notch 37 blanks that tend to stick to punch 74 after the operating stroke. In order to prevent the punched out slug 100 from likewise sticking to punch 74 and being carried upward, spring operated pin 103 is provided in the wall of die block 65 as is best illustrated in Figure 6. As punch 74 reaches its lowest limit the punch and punched out slug 100 will push pin 103 to the right as viewed in Figure 6 against the action of its spring. When punch 74 is raised, pin 103 will be pushed to the left by its spring and knock loose any slug 100 tending to stick to the punch. The slug 100 will then fall down through passageway 104 into a suitable bin or receptacle.

Ejecting station

Ejecting station 42, Figures 1 and 7, is the fifth and final operating station. No die block is needed at this station since the only operation performed is the final ejection of blank 20 from dial 38. This is accomplished by means of a punch 105 which serves to push the blank out of the dial notch 37 so that it will fall through passageway 106 into a suitable bin or hopper. From the bin or hopper the blanks are carried or mechanically conveyed to the machine where they are tapped. As hereinbefore explained, punch 105 passes through the stripper 101, Figures 1 and 7, which serves to knock off blanks tending to stick to punch 105 after its operating stroke.

Limit switches

Mounted on the die shoe cover, Figure 1, are two limit switch assemblies which are provided to prevent the operation of the press when no blank is carried to an operating station. Checking jaws for the limit switch assembly are shown at 107. These are undercut at 108 so that the undercut portion 109 of the jaw may be inserted in a horizontal slot cut into a checking jaw bracket 110. The jaw 107 is pivoted at one corner on a pin 112 fixed in the bracket 110. In the same plane with the jaw bracket slot and normal to it is an horizontal bore in which is inserted a spring 113 which pushes against the edge of the checking jaw which is inserted in the slot and tends to rotate the jaw about its pivot 112 in a counterclockwise direction as viewed in Figure 1. At another corner of jaw 107 there is a vertical operating pin 114 integral with the jaw and which in its normal position is held against the actuating rod 115 of a stationary limit switch control of conventional design generally indicated at 116. The switch control 116 is mounted by some suitable means such as bracket 117 secured to the checking jaw bracket 110 by screws 118.

It will be readily apparent from Figure 1 that the nose 119 of the checking jaw 107 is held in its normal position as long as there is a blank 20 in the dial notch 37 or a punch is being pushed through the dial notch during an operating stroke. However, if for some reason there is no blank in the dial notch the nose 119 will be pushed into the notch by the action of spring 113 rotating the jaw 107 about its pivot point 112. When this takes place the operating pin 114 is moved from switch actuating rod 115 allowing the actuating rod to move out and trip the switch. The limit switch, which is generally in series with a solenoid, is connected by suitable means to the drive of the press assembly so that it is stopped when either limit switch is tripped. In this way injury to the press and die mechanism is avoided in event a blank is not ejected from the die due to failure of operation of a knockout pin, or a blank sticking to the punch and being carried upward with the punch.

Individual vertical adjustment of punches

It is important in the forging press assembly that the punches at the operating stations be individually adjustable in the vertical direction. In order to insure accurate and efficient operation, the exact depth to which any punch will descend on an operating stroke must be closely controlled. In the present invention individually adjustable mechanisms are provided for the punches which not only result in accurate depth control but enable ease of vertical adjustment and replacement of punches. The adjustment or replacement may take place without using shims thus saving production time normally lost in the methods of the prior art. This ease in obtaining accurate control, adjustment, replacement and use of small perishable tools also results in prolonged tool life, since all unnecessary wear is eliminated, and the ease of replacement allows damaged tools to be readily replaced and repaired before irreparable damage is done. Referring now to Figures 3–6 it will be seen that the punch holder has an outer hollow cylinder 120 securely fixed to the punch holder plate 81 by some means such as screws 82. Threaded in cylinder 120 is an inner hollow cylinder 121 of longer length than cylinder 120, and threaded to cylinder 121 are two locking collars 123 and 124 and an adjusting collar 125. The lower portion of the bore of cylinder 121 is tapered at 126, and fitted therein is a hollow frustum of a cone 127 which serves as a tapered collet. The collet 127 is bored to fit closely the shank of the punch.

The initial and approximate adjustment is obtained by inserting in the bore of cylinder 121 above the punch a backing block 128 which serves to approximately locate the punch in the holder. The shank of the punch is then inserted into the punch holder and adjusting collar 125 is tightened by some means such as a spanner wrench. At this time locking collars 123 and 124 are preventing cylinder 121 from turning relative to outer cylinder 120. As collar 125 is turned it will force tapered collet 127 upwardly until the punch is tightly held in position in the inner cylinder 121. After this is done locking collars 123 and 124 are loosened and the exact vertical adjustment of the punch is obtained by further turning adjusting collar 125. Since collar 125 has been tightened as far as possible with respect to cylinder 121, further turning of the collar will cause the cylinder 121 to move with respect to the outer cylinder 120 until the exact adjustment desired is obtained. When so adjusted, locking collars 123 and 124 are again tightened against cylinder 120 so that no further relative movement between any of the parts is possible.

Modified pre-forming and second forming operations

Figures 24–33, inclusive, illustrate modified forms of punches for the pre-forming and second forming stations and the modified blanks formed therein. It will be noted from Figures 20 and 21 that the end product of the principal embodiment of this invention is a blank chamfered on one side only. It may also be desirable to have a finished blank that is chamfered on two sides, and this may be accomplished by modifying the pre-forming operation of the invention as will now be described.

Figure 24:
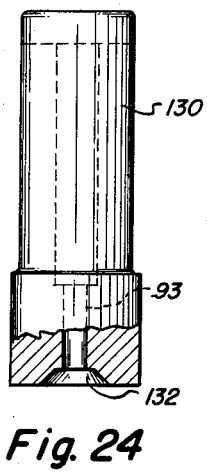
Figure 24 is a side view partly in section of a modified pre-forming punch.
Figure 26:
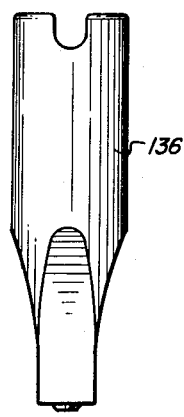
Figure 26 is a side view of a modified upper punch for the second forming station.
Figure 28:
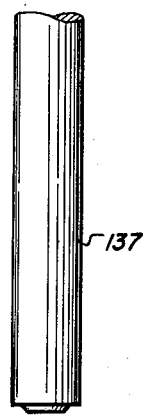
Figure 28 is an enlarged side view of a modified lower punch for the second forming station.
Figure 25:
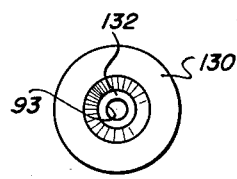
Figure 25 is an end view of the modified pre-forming punch.
Figure 27:
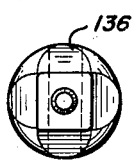
Figure 27 is an end view of the modified upper punch for the second forming station.
Figure 29:
Figure 29 is an enlarged end view of the modified lower punch for the second forming station.
Figure 30:
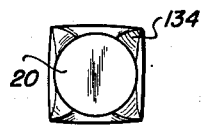
Figure 30 is an enlarged plan view of a blank after a modified pre-forming operation.
Figure 31:
Figure 31 is an enlarged end view of a blank after the modified pre-forming operation.
Figure 32:
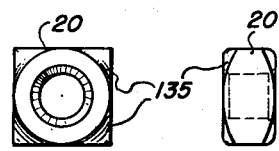
Figure 32 is an enlarged plan view of a finished double chamfered blank.
Figure 33:
Figure 33 is an enlarged end view of a finished double chamfered blank.

In the modified form of the invention the pre-forming operation is changed by providing a modified pre-forming punch 130, Figures 24 and 25. Punch 130 has the same dimensions as pre-forming punch 83 and is provided with a similar center bore and holding down pin 93. However, in the bottom or working end of punch 130 the channel 87 of punch 83, Figures 10 and 11, has been replaced by a frusto-conical shaped recess 132, Figures 24 and 25. This modified pre-forming punch 130 will cause the slug 20 to be formed in the pre-forming operation with a deeper and more rounded chamfer 134 on its top surface as is shown in Figures 30 and 31. Pre-forming the slug in this way will cause the finished product to be chamfered on two sides as shown in Figures 32 and 33 even though the remaining forming stations are unchamfered. The reason for this result is because with the exaggerated initial chamfer 134 the subsequent unmodified forming operations will not displace the metal sufficiently to completely fill the deeply chamfered upper edges. As a consequence a modified chamfer 135, Figures 32 and 33, will remain on the upper side assuming that pressures applied throughout are the same as those used in the principal embodiment. It will be recalled that the bottom chamfer is the result of the rounded edges of the die block cavities at the second and third forming stations. Thus it will be understood that this novel invention can, by means of a modified pre-forming operation, produce blanks having a double chamfer as well as those chamfered only on one side.

Figure 34:
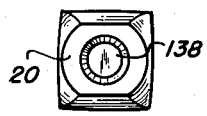
Figure 34 is an enlarged plan view of a blank after a modified second forming operation.
Figure 35:
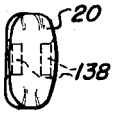
Figure 35 is an enlarged end view of a blank after the modified second forming operation.

It may be necessary in producing some sizes or thicknesses of blank, of either the single or double chamfered type, to perform the countersinking operation in two stages in order to prevent overforming or overstressing the metal. When this becomes necessary the first stage of countersinking is done at the second forming station and the third station or regular countersinking station merely completes the operation. The third station, therefore, is not changed and operates in the manner hereinbefore described. The second forming station, however, must be modified and this is provided for by substituting the modified upper and lower countersinking punches 136 and 137, Figures 26 and 28, respectively, for upper punch 70 and knockout pin 97 which are normally used at the second forming station. Modifying the second forming station in this manner results in a blank 20 partially countersunk at 138 as illustrated in Figures 34 and 35. The countersinking is then completed at the third station and the remaining operations performed in sequence as hereinbefore described.

It will be understood from the foregoing description that this invention provides an efficient solution to the long standing problem of forming square, rectangular, and odd shaped blanks from round stock. By means of the invention such blanks may be formed or swaged from relatively cheap round wire or rods while the waste material involved is a very low 7–8 per cent. Thus high quality blanks may be produced at a considerably higher speed than is attained by the methods of the prior art, while at the same time effecting a very substantial saving in the cost of production.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In apparatus for making four-sided nuts from cylindrical slugs, means for introducing said slugs in succession into a first forming station, means comprising a punch movable in a direction normal to the axis of the slug at said first forming station for deforming the slug in the station into a four-sided nut blank, an intermittently rotatable dial having a plurality of outwardly open pockets on its periphery shaped to receive the nut blanks, means synchronized with movement of said dial for removing said nut blank from the first forming station and moving it into one of said pockets, means defining a flat support surface for said nut blanks below the dial having a plurality of die cavities at spaced circumferential forming stations about said dial into which each nut blank is deposited when the dial reaches that position, nut forming means at each station, and means at each station operative after the nut forming operation to return the nut blank to the dial pocket to enable the nut blank to be moved along said surface to the next station.

2. In apparatus for making four-sided nuts from cylindrical slugs, means for feeding said slugs in succession to a first forming station, means comprising a punch movable in a direction normal to the axis of the slug at said first forming station for deforming the slug in the station into a four-sided nut blank, an intermittently rotatable dial having a plurality of outwardly open pockets on its periphery shaped to receive the nut blank, means synchronized with movement of said dial for removing said nut blank from the first forming station and moving it into one of said pockets, means defining a flat support surface for said nut blanks below the dial having a plurality of die cavities at spaced circumferential forming stations about said dial into which each nut blank is deposited when the dial reaches that position, said support surface extending to said first forming station, and said means for moving each nut blank from said first forming station to the dial comprising means for sliding the nut blank along said surface, nut forming means at each station, and means at each station operative after the nut forming operation to return the nut blank to the dial pocket to enable the nut blank to be moved along said surface to the next station.

3. In apparatus for making four-sided nuts from cylindrical slugs, means for introducing said slugs in axial succession into a first forming station, means comprising a punch movable in a direction normal to the axis of the slug at said first forming station for deforming the slug in the station into a four-sided nut blank, an intermittently rotatable dial having a plurality of outwardly open pockets on its periphery shaped to receive the nut blanks, means synchronized with movement of said dial for removing said nut blank from the first forming station and moving it into one of said pockets, means defining a flat support surface for said nut blanks below the dial having a plurality of die cavities at spaced circumferential forming stations about said dial into which each nut blank is deposited when the dial reaches that position, said means for moving each nut blank from said first forming station to the dial comprising means reciprocable substantially parallel to said surface and adapted to push the nut blank toward the pocket in a direction substantially normal to the slug axis, nut forming means at each station, and means at each station operative after the nut forming operation to return the nut blank to the dial pocket to enable the nut blank to be moved along said surface to the next station.

4. In apparatus for making four-sided nuts from cylindrical slugs, means for introducing said slugs in succession into a first forming station, means comprising a punch movable in a direction normal to the axis of the slug at said first forming station for deforming the slug in the station into a four-sided nut blank, an intermittently rotatable dial having a plurality of outwardly open pockets on its periphery shaped to receive the nut blanks, means defining a flat support surface for said nut blanks below the dial having a plurality of die cavities at spaced circumferential forming stations about said dial into which each nut blank is deposited when the dial reaches that position, said first forming station comprising a die block whose top is an effective extension of said surface and is provided with a concave bottom die cavity of less depth than the diameter of a slug and a slug guide channel leading axially into said concave bottom die cavity, means reciprocable normal to the axis of the slug in said concave die cavity synchronized with movement of said dial for pushing said nut blank from said concave cavity and sliding it into one of said pockets, nut forming means at each station, and means at each station operative after the nut forming operation to return the nut blank to the dial pocket to enable the nut blank to be moved along said surface to the next station.

5. In apparatus for making four-sided nuts from cylindrical slugs, means for introducing said slugs in succession into a first forming station, means comprising a punch movable in a direction normal to the axis of the slug at said first forming station for deforming the slug in the station into a four-sided nut blank, an intermittently rotatable dial having a plurality of outwardly open pockets on its periphery shaped to receive the nut blanks, means synchronized with movement of said dial for removing said nut blank from the first forming station and moving it into one of said pockets, means defining a flat support surface for said nut blanks below the dial having a plurality of die cavities at spaced circumferential forming stations about said dial into which each nut blank is deposited when the dial reaches that position, said dial comprising a hub and a plurality of similar sector plates projecting radially therefrom over said surface, an outwardly open nut blank receiving pocket in the outer periphery of each sector plate, means detachably mounting said sector plates on said hub so that said sector plates are interchangeable or replaceable with sector plates having different pockets, nut forming means at each station, and means at each station operative after the nut forming operation to return the nut blank to the dial pocket to enable the nut blank to be moved along said surface to the next station.

6. In apparatus for making four-sided nuts from cylindrical slugs, means for introducing said slugs in succession into a first forming station, means comprising a punch movable in a direction normal to the axis of the slug at said first forming station for deforming the slug in the station into a four-sided nut blank, an intermittently rotatable dial having a plurality of outwardly open pockets on its periphery shaped to receive the nut blanks, means synchronized with movement of said dial for removing said nut blank from the first forming station and moving it into one of said pockets, means defining a flat support surface for said nut blanks below the dial having a plurality of die cavities at spaced circumferential forming stations about said dial into which each nut blank is deposited when the dial reaches that position, nut forming means at each station including a vertically reciprocable punch above the dial and associated with a die cavity, and means at each station operative after the nut forming operation to return the nut blank to the dial pocket to enable the nut blank to be moved along said surface to the next station, and means at the periphery of said dial at one of said forming stations operable to stop the apparatus when there is an incomplete sequence of nut blanks in the dial pockets passing through said stations.

CARLETON W. EADE.
WILLIAM W. SCHUG.

References Cited in the file of this patent

UNITED STATES PATENTS

| Number | Name | Date |
|---|---|---|
| 10,493 | Reese | Feb. 7, 1854 |
| 833,187 | Ward | Oct. 16, 1906 |
| 1,040,265 | Bosler | Oct. 8, 1912 |
| 1,076,079 | Tideman | Oct. 21, 1913 |
| 1,737,443 | Wilcox | Nov. 26, 1929 |
| 1,796,681 | Avis | Mar. 17, 1931 |
| 1,832,168 | Wilcox | Nov. 17, 1931 |
| 1,847,631 | Soss | Mar. 1, 1932 |
| 1,992,102 | Syversen | Feb. 19, 1935 |
| 2,015,596 | Harvey | Sept. 24, 1935 |
| 2,022,076 | Costin et al. | Nov. 26, 1935 |
| 2,039,841 | Howland | May 5, 1936 |
| 2,100,357 | Rosborough | Nov. 30, 1937 |
| 2,294,458 | Hungerford | Sept. 1, 1942 |
| 2,303,226 | Olson | Nov. 24, 1942 |
| 2,338,095 | Campbell | Jan. 4, 1944 |
| 2,361,546 | Hogue | Oct. 31, 1944 |
| 2,364,733 | McCollum | Dec. 12, 1944 |
| 2,380,584 | De Loe | July 31, 1945 |
| 2,544,218 | Burdsall | Mar. 6, 1951 |
| 2,547,801 | Wilcox | Apr. 3, 1951 |
| 2,603,987 | Lyon | July 22, 1952 |

FOREIGN PATENTS

| Number | Country | Date |
|---|---|---|
| 561,309 | Great Britain | May 15, 1944 |